Figure 1:
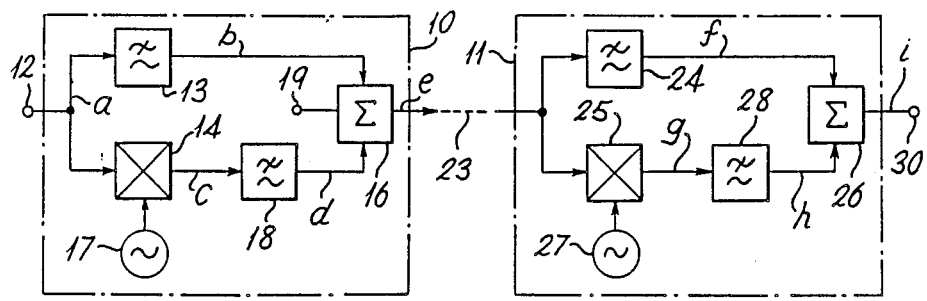

United States Patent [19]

McGeehan et al.

[11] Patent Number: 4,792,985

[45] Date of Patent: Dec. 20, 1988

[54] TRANSMITTERS AND SYSTEMS FOR TONE-IN-BAND TRANSMISSION

[75] Inventors: Joseph P. McGeehan, Corsham; Andrew Bateman, Bath, both of United Kingdom

[73] Assignee: National Research Development Corporation, London, England

[21] Appl. No.: 798,801

[22] Filed: Nov. 15, 1985

[30] Foreign Application Priority Data

Nov. 30, 1984 [GB] United Kingdom ................. 8430319

[51] Int. Cl.$^4$ ............................................. H04B 1/76
[52] U.S. Cl. ....................................... 455/48; 375/43; 455/71; 455/118
[58] Field of Search .................. 370/110.1, 110.4, 111; 178/22.01; 455/26, 46, 47, 59, 71, 48, 67, 68, 70, 103, 118, 257, 265; 375/43, 97, 41; 329/50; 380/38, 31, 33, 34, 39, 40

[56] References Cited

U.S. PATENT DOCUMENTS 1,750,688  3/1930  Potter ..................................... 380/39
4,195,202  3/1980  McCalmont ........................... 380/39

FOREIGN PATENT DOCUMENTS 2028064  2/1980  United Kingdom ................. 455/71

OTHER PUBLICATIONS

IEEE Conference on Communication Equipment Systems, Apr. 20-22, 1982, pp. 121-126, McGeehan, Bateman and Burrows.

Simultaneous Speech and High Speed Data Transmission over a Voice Grade Channel by B. Kaufman-ICC June 1983, pp. 1644-1646.

The Use of "Transparent" Tone-In-Band (TTIB) and Feedforward Signal Regeneration (FSSR) in Single Sideband Mobile Communication Systems, IEE Conf. Communications, pp. 121-126.

Primary Examiner—Benedict V. Safourek
Attorney, Agent, or Firm—Cushman, Darby & Cushman

[57] ABSTRACT

In those transparent tone-in-band systems which employ a single oscillator in the transmitter to generate a frequency notch between upper and lower portions of a band which is to be transmitted, there is not complete freedom to choose the width of the notch. In the present invention which also uses a single transmitter oscillator, one portion of the band transmitted is selected using a filter. A mixer is used to change the frequency of the input band in a way which does not allow the lower sideband to "fold" back at zero frequency and interfere with the lower transmitted portion. A further filter selects the other portion for transmission from the output of the mixer.

8 Claims, 2 Drawing Sheets

TRANSMITTERS AND SYSTEMS FOR TONE-IN-BAND TRANSMISSION

CROSS REFERENCE TO RELATED APPLICATIONS

This application is related to, and has the same inventorship as, copending applications 06/617,733, 06/764,984, and 06/890,335.

The present invention relates to the generator of a "notch" for transparent tone-in-band (TTIB) systems.

Some TTIB systems are described by J. P. McGeehan, A. J. Bateman and D. F. Burrows in "The Use of 'Transparent' Tone-In-Band (TTIB) and Feedforward Signal Regeneration (FFSR) in Single Sideband Mobile Communication Systems", IEE Conference on Communications Equipment and Systems 82, pages 121 to 126, 1982. In a TTIB system the spectrum of a baseband signal, for example from 300 Hz to 3 kHz, is split into two approximately equal segments, for instance from 300 Hz to 1.7 kHz and 1.7 kHz to 3 kHz. The upper frequency band is translated upward in frequency by an amount equal to the width of an intervening "notch" and added to the lower frequency band. If for example the required "notch" width or band separation is 1.2 kHz the circuit output will comprise a signal extending from 300 kHz to 1.7 kHz and from 2.9 to 4.2 kHz. A low level reference tone may then be added at the centre of the resulting notch which in this example would be 2.3 kHz and the composite signal is then transmitted using conventional techniques, such as single sideband (SSB), with the pilot tone in the notch acting as the reference for subsequent pilot-based processing. In the receiver, the final stages of audio processing remove the pilot in the usual way (for use in, for example automatic gain control and automatic frequency control purposes) and perform a complementary downwards frequency translation of the upper half of the spectrum thereby regenerating the original 300 Hz to 3 kHz baseband signal. Thus TTIB gives a complete transparent channel from the baseband input of the transmitter to the baseband receiver output avoiding the disadvantage of removing a section of the band in order to insert the pilot tone but obtaining the advantages of high degree of adjacent channel protection, good correlation between fades on the pilot tone and fades on the audio signal, and a large symmetrical pull-in range for the frequency control to operate.

As is known the notch may be provided by using a single mixer circuit, a low-pass filter, a band-pass filter and a summing circuit. (See FIG. 2 of the above mentioned paper.) The lower portion passes directly by way of the low-pass filter to the summing circuit but the whole frequency band is applied to the mixer circuit and at the output of the mixer part of the upper sideband, corresponding to that part of the input band which is rejected by the low-pass filter, is applied to the summing circuit. A disadvantage of this arrangement is that there is not complete freedom to choose the notch width and for this reason it is usual to employ two mixer circuits in the way shown in FIG. 1 of the above mentioned paper where notch width may selected as required. The restriction on notch width with the single oscillator system arises when the carrier frequency for the mixer is made so low that the lower sideband would extend below zero by an amount exceeding the frequency range between zero and the lower portion of the upper sideband. In these circumstances that portion which would extend below zero is "folded" back into the positive frequency region where it extends into the upper sideband and interferes with it.

According to a first aspect of the present invention there is provided a signal processor for a communication system comprising means for selecting a first portion of a band of interest in the frequency spectrum, means for frequency translation and selection to provide a second translated portion of the said band by a process which includes the generation of signals which are representative of lower and/or upper sidebands, the frequency translation providing a required frequency notch between the first and second portions, with the second portion then being one of the following:

a lower part of the lower sideband of the translated portion, an upper part of the lower sideband of the translated portion, and a lower part of the upper sideband of the translated portion, and means for combining the first and second portions.

Typically the signal processor of the first aspect forms part of a transmitter for a radio or line link when the signal from the combining means is transmitted with or without further processing. The means for frequency translation may comprise an amplitude modulator or a digital frequency translator.

The main advantage of the invention is that even though only one step of frequency translation is carried out there is no restriction on the width of the notch. Thus the frequency translation means may be a single mixer circuit. Even where the upper sideband of the first portion is transmitted no "folding" about zero frequency occurs, as is now explained: the frequency of the carrier signal used in the frequency translation process must be equal to or greater than the frequency at the lower end of the notch so that when the upper sideband is formed by adding the lowest frequency in the input band to the carrier the result rests just above the notch; then the lower sideband has its lowest frequency (that obtained by subtracting the highest frequency below the notch away from the carrier frequency) at a minimum frequency of not less than 0 Hz, and "folding" cannot occur.

Where the upper part of the lower sideband of the translated portion or the lower part of the upper sideband of the translated portion is used in transmission, the invention has a further advantage in that a measure of security is provided, in addition to that already afforded by TTIB, because the normal ascending frequency spectrum is reversed; so that above the notch high frequencies in the input band become low frequencies in the transmitted signals and vice versa. In order to improve security means may be provided for varying the notch width using a control signal applied to both the TTIB transmit and receive circuits or the receiver may generate a control signal allowing notch width variations to be followed (see UK Patent Application No. 8421025—Inventors: McGeehan and Bateman—filed Aug. 17 1984). Security between different manufactured versions of a system including a transmitter according to the invention can be provided by using different predetermined notch widths for respective systems.

According to a second aspect of the invention there is provided a communication system comprising a transmitter including a signal processor according to the first aspect, and a receiver coupled to the transmitter comprising means for restoring the portion of the band which was translated in frequency to its original position in the frequency spectrum, and summing means for combining the portion below the notch and the portion whose position has been restored to provide an output signal.

According to a third aspect of the present invention there is provided a method of providing a "notch" for a transparent tone-in-band signal comprising selecting a first portion of a band of interest in the frequency spectrum, operating on the said band by frequency translation and selection to provide a second translated portion of the said band by a process which includes the generation of signals which are representative of upper and/or lower sidebands, the frequency translation providing a required frequency notch between the first and second portions, with the second portion then being one of the following:

a lower part of the lower sideband of the translated second portion, an upper part of the lower sideband of the translated second portion, and a lower part of the upper sideband of the translated second portion, and combining the first and second portions.

Figure 2A:
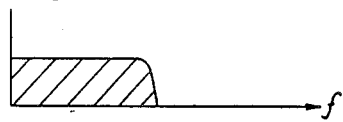
Figure 2B:
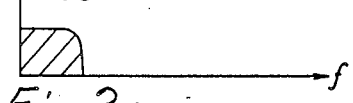
Figure 2C:
Figure 2D:
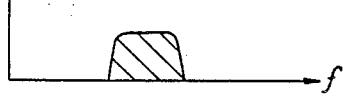
Figure 2E:
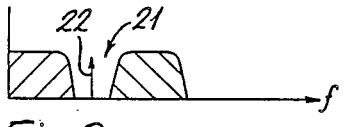
Figure 2F:
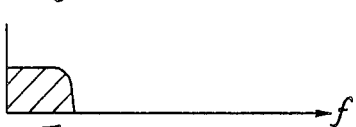
Figure 2G:
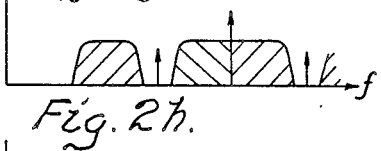
Figure 2H:
Figure 2I:
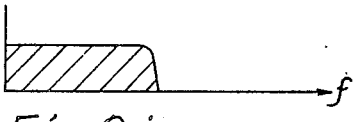
Figure 3A:
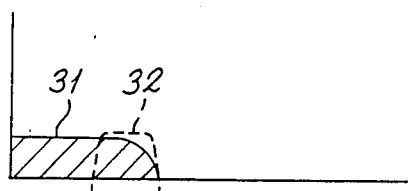
Figure 3D:
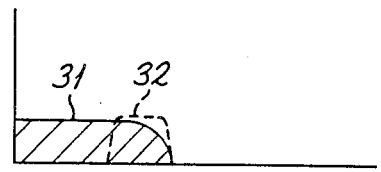
Figure 3B:
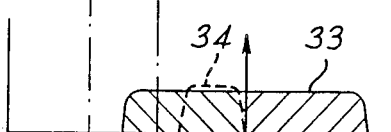
Figure 3E:
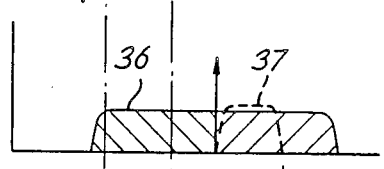
Figure 3C:
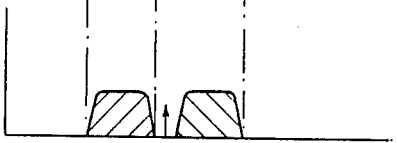
Figure 3F:
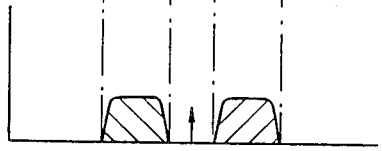
Figure 4:
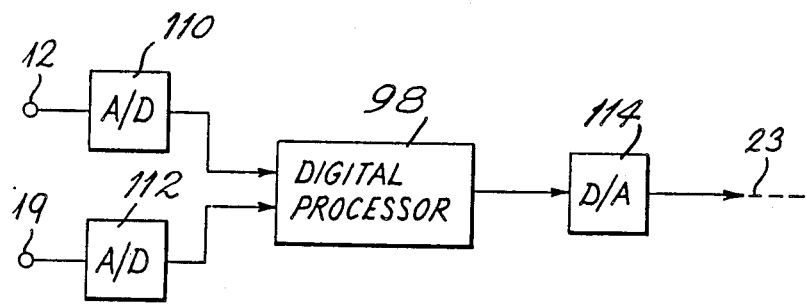

Certain embodiments of the invention will now be described by way of example, with reference to the accompanying drawings, in which:

FIG. 1 is a block diagram of a TTIB communications system according to the second aspect of the invention including a transmitter according to the first aspect thereof, FIGS. 2(a) to 2(i) are frequency spectra illustrating the operation of one form of the system of FIG. 1, FIGS. 3(a) to 3(f) are spectra illustrating the operation of two other forms of the system of FIG. 1, and FIG. 4 is a block diagram of a transmitter according to an aspect of this invention which uses a digital processor.

In FIG. 1 a TTIB transmitter 10 is coupled to transmit signals to a TTIB receiver 11 and the letters appearing in brackets in FIG. 1 refer to spectra illustrated in FIG. 2 and designated with the same letter.

Input signals which may be for example audio, intermediate frequency, analogue or digital are, in operation, applied by way of a terminal 12 to a low-pass filter 13 and a mixer circuit 14. The lower portion of the applied frequency band is passed by the filter 13 and reaches a summing circuit 16. FIG. 2(a) illustrates the band of signals applied at the terminal 12 while FIG. 2(b) shows the output spectrum from the filter 13 which is applied to the summing circuit 16. The mixer 14 translates the signals applied at the terminal 12 upwards in frequency by an amount dependent on the frequency of a carrier signal generated by an oscillator 17 and the resultant output spectrum is shown in FIG. 2(c). A low-pass filter 18 passes those signals in the lower sideband of the output signal from the mixer 14 which correspond to that part of the spectrum of FIG. 2(a) which is removed by the filter 13. The spectrum of the output signals from the filter 18 is shown in FIG. 2(d) and these signals reach the circuit 16 where the resultant output spectrum is as shown in FIG. 2(e). A notch 21 is shown between the untranslated lower portion of the input band and the frequency translated portion of the upper band. This notch may be used to contain a pilot signal 22 applied by way of a terminal 19 for the summing circuit 16.

The notch width can be chosen as required by choice of the frequency of the oscillator 17 since the lower sideband of the signal at the output from the mixer 14 can be made to approach the cut-off frequency of the filter 13 as nearly as required without any unwanted signals appearing in the output of the transmitter 10.

In this embodiment of the invention the translated upper portion of the spectrum is reversed in frequency; that is the lower end of the upper portion of the spectrum in FIG. 2(e) corresponds to the upper end of FIG. 2(a) while the upper end of FIG. 2(e) corresponds to the cut-off frequency of the filter 13 where the spectrum of FIG. 2(a) is divided. The shading in FIGS. 2 and 3 indicates by its gradient the direction of increase in frequency referred to the original input signals at the terminal 12. As has been mentioned this reversal provides additional security to that already given by the insertion of the notch in a TTIB system. A conventional receiver, that is one which does not function according to the TTIB system, does not produce a useful output for most data formats when the notch is present but additionally with the transmitter 10 neither do known TTIB receivers.

Signals transmitted from the summing circuit 16 are coupled to the receiver 11 by way of a link 23 which may, for example, be a local or long distance static or mobile radio link or a telephone line. Thus the link 23 usually includes many circuits not shown including for example those required for SSB radio. At the receive end of the link 23 use is made of the pilot signal according to the way in which the link operates but at the appropriate point signals received are applied to a low-pass filter 24 and a mixer circuit 25. The output from the filter 24 is shown in FIG. 2(f) and is applied to a summing circuit 26. The mixer 25 also receives a signal from a local oscillator 27 which is at the same frequency as the oscillator 17 and may be controlled in one of the known ways, or for example as disclosed in the above mentioned application No. 8421025. The spectrum of the output signal from the mixer 27 is shown in FIG. 2(g) and is applied to a low-pass filter 28 which removes all frequencies except that part of the lower sideband which is below the notch. Thus the output of the filter 28 is shown in FIG. 2(h) and the original spectrum applied at the terminal 12 is recovered as illustrated in FIG. 2(i) at an output terminal 30 of the summing circuit 26 which sums the outputs from the filters 24 and 28.

In another embodiment of the invention the lower portion of the signal applied at the terminal 12 is translated in frequency using a mixer circuit to a position above the upper portion, and the upper portion of the transmitter input signal together with part of the lower sideband of the mixer output signal is combined to give the signal for transmission. In such an arrangement the upper portion of the input band is applied to the summing circuit 16 by way of a band-pass filter which replaces the filter 13 and selects the required upper portion. The frequency of the oscillator 17 is chosen so that that part of its lower sideband which corresponds to the lower portion of the input band is immediately above the required notch. A composite spectrum is shown in FIG. 3(a) where the input spectrum at the terminal 12 is shown at 31 and the output signal from the bandpass filter replacing the filter 13 is shown by a dashed line 32.

The output signal from the mixer 14 is shown at 33 in FIG. 3(b). A bandpass filter which selects that part 34 of the lower sideband at the output of the mixer 14 which corresponds to signals having frequencies below the band 32 replaces the filter 18 so that the output signal from the summing circuit 16 is as shown in FIG. 3(c).

Another alternative is to translate the lower portion of the input band at the terminal 12 to a position in the frequency spectrum in which the lower portion of its upper sideband is just above the required notch. For this purpose the same replacement is used for the filter 13 as is mentioned above but the frequency of the oscillator 17 is chosen such that its upper sideband is immediately above the required notch and then the replacement for the filter 18 is a bandpass filter selecting those signals in the upper sideband which correspond to the portion of the input band below the portion 31. FIG. 3(d) is a composite spectrum showing the spectrum 31 and at 32 the output of the filter 13. FIG. 3(e) shows the output 36 of the mixer 14 when the frequency of the oscillator 17 is chosen as indicated, and the output 37 of the replacement for the filter 18. In FIG. 3(f) the output spectrum from the summing circuit 16 for this alternative is shown.

For both these alternatives the receiver 11 is as shown in FIG. 1 except that the filters 24 and 28 are bandpass filters corresponding to the portions 32 and 34 or 37. The local oscillator 27 again has the same frequency, either controlled or stabilised, as the oscillator 17 and the lowpass filter 28 is designed to remove all signals above the lower end of the portion 32.

The frequency extremities of a link such as the link 23 often have somewhat inferior amplitude and phase distortion characteristics, largely owing to the shortcomings of filters used, but this situation is acceptable in conventional links because signals at frequency extremities of a band are usually not so important as those towards the centre of the band. In the alternatives illustrated by the spectra of FIGS. 2(e), 3(c) and 3(f), the sensitive parts of the band are more likely to be distorted during transmission because at least some of them occur at the extremities of the spectrum. For example in of FIG. 3(f) both extremities correspond to the break between the upper and lower portions of the input signal. Thus the embodiment having the spectra of FIGS. 2(a) to 2(i) and the alternative with spectra 3(a) to 3(c) are in this respect, the preferable embodiments, since only one portion has an extremity which originates at the centre of the band.

While certain specific embodiments of the invention have been described it will be clear that the invention can be put into practice in many other ways. For example other circuits for frequency translation than the mixer circuits described above may be used with appropriate filters. All or part of the circuits shown may be replaced by one or more than one digital processors 98 in which the frequency translations and other functions are carried out, as shown in FIG. 4. For example the transmitter 10 and the receiver 11 have analogue-to-digital converters 110 and 112 at their inputs 12 and 17. A digital-to-analogue converter 114 is then located at their outputs. Digital filters are then used where filtering is required and where frequency translation is needed digital codes representing amplitudes are multiplied together resulting in digital signals representative of signals which have lower and/or upper sidebands.

The invention may also be used, where appropriate, with the circuits described in U.S. patent application No. 617,733 and as indicated above with the variable notch width circuits of UK Application No. 8421025.

We claim:

1. A method of providing a "notch" for a transparent tone-in-band signal, comprising the steps of:
   selecting a first frequency portion of a band of interest in the frequency spectrum;
   operating on said band to provide a second frequency portion separated from said first portion by a notch in the frequency spectrum by frequency translation and selection of signals in said band by generating signals which are representative of at least one sideband, the frequency translation employing only one frequency translation step and providing a required frequency notch between the first and second portions, with the second portion then being one of the following:
   (a) a lower part of the lower sideband of the translated portion,
   (b) an upper part of the lower sideband of the translated portion, and
   (c) a lower part of the upper sideband of the translated portion; and
   combining the first and second portions.

2. A method as in claim 1 wherein said first frequency portion is lower in frequency than said second frequency portion, and represents a range of frequencies which are higher in the input band than the frequencies represented by said second frequency portion.

3. A signal processor for a communication system comprising:
   an input terminal for receiving input signals, and an output terminal;
   selecting means, coupled to receive said input signals from said input terminal, for selecting a first frequency portion of a band of interest in the frequency spectrum;
   notch-establishing means, also coupled to receive said input signals from said input terminal, for establishing a notch in the frequency spectrum to appear to the output terminal by frequency translation and selection to provide, from said input signals, a second translated frequency portion of said band, said notch establishing means employing only one frequency translation step and locating said notch between the first and second portions by generating signals which are representative of at least one sideband, the second portion then being one of the following:
   (a) a lower part of the lower sideband of the translated portion,
   (b) an upper part of the lower sideband of the translated portion, and
   (c) a lower part of the upper sideband of the translated portion;
   means for combining said first and second portions to produce a resultant signal, coupled to receive signals from said selecting means and from said notch-establishing means and having an output coupled to pass signals to said output terminal,
   wherein said notch-establishing means is also for ensuring that at least some of those signals, which before frequency translation and selection are in the region of said band which is later occupied by the notch, are represented at a significant level in one of the first and second portions.

4. A signal processor according to claim 3 wherein said notch establishing means comprises means for supplying carrier signals, mixer means for generating from the band of interest and the carrier signal, that sideband containing said second portion and another sideband, and filter means coupled to said mixer means for selecting said second portion from the sideband in which it is included.

5. A signal processor according to claim 3 wherein said selecting means, said notch establishing means and said combining means include at least one digital processor.

6. An apparatus as in claim 3 wherein said first frequency portion is lower in frequency than said second frequency portion, and represents a range of frequencies which are higher in the input band than the frequencies represented by said second frequency portion.

7. A communication system comprising:

a transmitter including a signal processor comprising:

(a) an input terminal for receiving input signals and an output terminal, (b) selecting means, coupled to receive said input signals from said input terminal, for selecting a first portion of a band of interest in the frequency spectrum, (c) notch-establishing means, also coupled to receive said input signals from said input terminal, for establishing a notch in a frequency spectrum to appear at said output terminal by frequency translation and selection using one one frequency translation step to provide, from said input signals, a second translated frequency portion of said band, and for locating said notch between the first and second portions by generating signals which are representative of at least one sideband, with the second portion then being a portion from the group consisting of:

the lower part of the lower sideband of the translated portion, an upper part of the lower sideband of the translated portion, and a lower part of the upper sideband of the translated portion; and (d) means for combining the first and second portions to produce a resultant signal, coupled to receive signals from the selecting means and the notch-establishing means and having an output coupled to pass signals to said output terminal, wherein said notch-establishing means is also for ensuring that at least some of those signals, which before frequency translation and selection are in the region of said band which is later occupied by the notch, are represented at a significant level in one of the first and second portions; and a receiver coupled to the transmitter, comprising:

(a) restoring means coupled to receive signals from the transmitter and for restoring the portion of the band which was translated in frequency to its original position in a frequency spectrum; and (b) summing means, coupled to receive signals from the transmitter and signals from the restoring means, for combining the portion below the notch and the portion whose position has been restored, to provide an output signal.

8. An apparatus as in claim 7 wherein said first frequency portion is lower in frequency than said second frequency portion, and represents a range of frequencies which are higher in the input band than the frequencies represented by said second frequency portion.

* * * * *